United States Patent [19]

Čoupek et al.

[11] 4,171,412
[45] Oct. 16, 1979

[54] SPECIFIC SORBENT HAVING D-AMINOACID MOIETY COVALENTLY BONDED TO SOLID PARTICULATE HYDROPHILIC POLYMERIC CARRIER

[75] Inventors: Jiří Čoupek, Prague; Jaroslava Turková Český Brod; Karel Bláha, Prague; Olga Valentová, Prague, all of Czechoslovakia

[73] Assignee: Ceskoslovenska akademie ved, Prague, Czechoslovakia

[21] Appl. No.: 568,776

[22] Filed: Apr. 17, 1975

[30] Foreign Application Priority Data

Apr. 25, 1974 [CS] Czechoslovakia ............... 2957/74

[51] Int. Cl.$^2$ ........................................... C08F 220/20
[52] U.S. Cl. ........................................ 525/329; 260/8; 260/29.7 H; 521/149; 521/187
[58] Field of Search .............. 260/78 A; 526/49, 56, 526/15, 16, 23

[56] References Cited

U.S. PATENT DOCUMENTS 3,971,765    7/1976    Green et al. ................... 260/78 A Primary Examiner—Harold D. Anderson

[57] ABSTRACT

The invention relates to specific sorbents based on hydrophylic polymeric gels, preferably of a macroporous character, which carry covalently bonded D-aminoacid or peptide which contain D-aminoacid units. The basic carrier prepared by copolymerization of hydroxyalkyl esters or hydroxyalkylamides of acrylic and methacrylic acid with crosslinking acrylate or methacrylate comonomers are modified by the reaction with diamines, aminoacids or dicarboxylic acids and the resulting carboxyterminal or aminoterminal groups are condensed with D-analogs of aminoacids or peptides. The peptide containing D-aminoacids can be also stepwise synthetized on the surface of the carrier. The specific sorbents are further used as insolubilized inhibitors in the affinity chromatography of proteolytic enzymes. They do not undergo an irreversible inactivation during repeated application and are suitable for technological purposes because of their mechanical and hydrolytical stability.

2 Claims, No Drawings

SPECIFIC SORBENT HAVING D-AMINOACID MOIETY COVALENTLY BONDED TO SOLID PARTICULATE HYDROPHILIC POLYMERIC CARRIER

The invention relates to specific sorbents, applicable especially in the affinity chromatography and prepared by bonding of aminoacids and peptides on hydrophilic macroporous gels using D-analogs of peptidic substrates and to a method of their preparation.

Synthetic inhibitors of excellent properties are formed in this way which are applicable in the affinity chromatography.

The affinity chromatography using insolubilized inhibitors is one of the most up-to-date methods for isolation of proteolytic enzymes, however, they are liable to an irreversible inactivation after multiple application due to their proteinous character and are not rather suitable for the technological purposes.

An objective of the invention are specific sorbents, prepared by copolymerization of hydroxyalkyl esters or hydroxyalkylamides of acrylic and methacrylic acid with crosslinking acrylate or methacrylate comonomers, which have bonded D-aminoacid or a peptide containing one or more D-aminoacid units through the covalent bond. These specific sorbents may have advantageously a macroporous structure. The basic carrier is modified by a reaction with compounds having the terminal carboxylic or amine functional groups selected from a group of compounds comprising diamines (e.g. 1,6-hexamethylenediamine), aminoacids (e.g. ε-aminocaproic acid) and dicarboxylic acids (e.g. glutaric acid). The gel modified in this way is then condensed in the usual way with D-analogs of aminoacids or peptides containing one or more D-aminoacids in the chain. The condensation can be carried out with an active ester of aminoacid or peptide (e.g. trichlorophenyl ester) or condensation agents, as 1-ethoxycarbonyl-2-ethoxy-1,2-dihydroquinoline. The specific sorbents may be also prepared by the stepwise condensation of a bonded peptide to the surface of the carrier. All specific sorbents prepared in this way were used in the affinity chromatography of enzymes giving very good results.

Specific sorbents prepared from low-molecular-weight synthetic inhibitors, as are e.g. D-analogs of peptidic substrates, are therefore more suited for isolation of proteases, because these sorbents remain unchanged in the presence of proteolytic enzymes. If the capacity of the sorbent decreased after multiple use, it may be fully recovered e.g. by washing with 6 M solution of guanidine hydrochloride.

Hydroxyalkyl acrylate and hydroxyalkyl methacrylate gels (Spheron) prepared according to the Czechoslovak Pat. Nos. 148,828 and 150,819 corresponding to U.S. applications Ser. Nos. 359,185 filed May 10, 1973, now abandoned and 281,288 filed Aug. 17, 1972, now abandoned respectively or hydroxyalkylacrylamide and hydroxyalkylmethacrylamide gels according to the Czechoslovak Pat. Nos. 147,113, 147,152, 149,376 and 154,386 corresponding to U.S. applications 314,213 filed Dec. 9, 1972, now abandoned; 657,602 filed Feb. 12, 1976, now U.S. Pat. No. 4,074,039 issued Feb. 14, 1978; 281,283 filed Aug. 17, 1972, now U.S. Pat. No. 3,876,594 issued Apr. 18, 1975; 235,427 filed Mar. 16, 1972, now abandoned respectively and the Czechoslovak Patent Application PV 2879-74 corresponding to U.S. application 568,777 filed Apr. 17, 1975, now U.S. Pat. No. 4,062,831 issued Dec. 13, 1977 may be advantageously used as carriers for preparation of the specific sorbents. Unlike the most often used carrier agarose, they can be modified by reactions in common organic solvents. Another advantage of the sorbents prepared in this way is the fact, that they may be readily dried without the necessary addition of protective compounds and then stored in the dry state. The remarkable mechanical and hydrolytical stability together with an absence of nonspecific sorption effects make them applicable in the technological scale.

Considering the low-molecular-weight character of peptides bonded to the polymer matrix, it is desirable to insert between the inhibitor and the surface of the gel a chain which puts off a functional molecule from the surface—so called "spacer." The specific sorbents are therefore advantageously prepared from hydroxyalkyl methacrylate gels with attached chains, as e.g. with 1,6-hexamethylenediamine of ε-aminocaproic acid and the like.

The preparation of aminoacyl or peptidyl derivatives bonded to the hydroxyalkylmethacrylate gel may be carried out according to the principle of peptide synthesis. An organic solvent is advantageously chosen as the reaction medium (the best is tetrahydrofuran, dimethylformamide or N,N',N''-hexamethylphosphortriamide in the case of low-soluble peptide derivatives) in combination with the usual condensation agents (the best are 1-ethoxycarbonyl-2-ethoxy-1,2-dihydroquinoline or active esters). The reaction may be also performed in an aqueous medium by means of a soluble carbodiimide.

Suitable protective groups for the amine group are tertbutyloxycarbonyl (cleavable by trifluoroacetic acid) or benzyloxycarbonyl (may be cleaved with 33% hydrogen bromide in acetic acid). The 2-nitrobenzenesulfenyl group is unsuitable because a coloured side product formed during cleavage (e.g. methyl 2-nitrobenzenesulfonate formed during cleavage with hydrogen chloride in methanol) is difficult to be washed out and its part is irreversibly bonded to the polymer. Carboxylic groups may be protected with tert-butyl or benzhydryl group which can be cleaved by trifluoroacetic acid. A properly protected derivative of aminoacid or oligopeptide may be attached to the carrier with bonded primary amino groups. All protective groups or selectively the N-α-groups may be cleaved off on completion of the reaction, washing with the same solvent which had been used in the reaction and with the 6 M aqueous solution of guanidine hydrochloride and drying. The amount of the incorporated aminoacid component depends on its structure. Generally, glycine is the most bonded and may be used for determination of the amount of —NH$_2$ groups present in the gel which can be acylated.

The stepwise building of peptides on a carrier containing amino groups is also possible starting with the carboxyterminal aminoacid residue. A group temporarily protecting N α is cleaved by common procedures and attachment of the further aminoacid derivative or peptide fragment may be again carried out by an activated ester or 1-ethoxycarbonyl-2-ethoxy-1,2-dihydroquinoline. Due to the different reactivity of individual aminoacid residues in the condensation reaction, a mixture of peptides, some of which have the incomplete chain, is attached to the polymer surface indeed after the stepwise synthesis or bonding of fragments on the polymeric hydroxy acrylate gel. The macroporous structure of hydroxyalkyl methacrylate gels is more convenient for achieving the higher yields of condensation than the homogeneous swellable three-dimensional network of polystyrene gels which are usually used in the condensation, the total substitution is lower but the more homogeneous product is obtained. The lower yield was registered in the stepwise building of the analogous hexapeptide even in the condensation of two tripeptidic fragments.

The same methods are used also in the condensation of peptides or aminoacids with the carboxylic derivative of hydroxyalkyl methacrylate gels. The carboxylic group of the reacting peptide component is protected by ester group cleavable with acids. The results of bonding of aminoacids and peptides to hydroxyalkyl methacrylate gels of the Spheron a trademark for a copolymer of 2-hydroxyethyl methacrylate with ethylene dimethacrylate type are summarized in the following Table where are presented the type of reaction and the content of covalently bonded aminoacids in the corresponding derivative.

An important requirement for application of specific sorbents in the affinity chromatography is achieving a high yield and purity of isolated proteases. Thus for instance, in isolation of amidopeptidase from a proteolytic preparation obtained from the mould Aspergillus flavus, the specific activity of the product after single-step affinity chromatography (2.19 units/mg of protein) can be compared with the activity of aminopeptidase which was isolated by Japanese authors (Nakadai et al.: Agr. Biol. Chem. 1973, 37, 757) from a crude enzymatic solution from Aspergillus oryzae (2.12 units/mg of protein). However, the latter isolation was performed by an extraordinarily laborious method consisting in sorption on Amberlite IRC (crosslinked polymer of methacrylic acid), fractionation by ammonium sulfate, precipitation with rivanol, chromatography on DEAE cellulose, and gel chromatography on Sephadex G-200 and G-100. The yield amounted only 0.438% of the activity of the processed material. The yield of aminopeptidase activity on the specific sorbents according to this invention is almost 100%. DEAE cellulose is a diethyl amino ethyl derivative of fibrilar or granular cellulose (Product of the Whatman Co.). Sephadex G 200 is a cross-linked homogeneous polydextrane with the exclusion limit 200,000 daltons (Product of Pharmacia Fin. Chemicals, Uppsala, Sweden). Sephadex G-100 has the exclusion limit 100,000 daltons.

The objective of the invention is further illustrated in following examples, without, however, limiting the scope of the invention to these examples.

TABLE

Results of condensation of aminoacids and peptides with substituted Spherons in tetrahydrofuran by means of 1-ethoxy-carbonyl-2-ethoxy-1,2-dihydroquinoline (Sph-hydroxyalkyl methacrylate gel of the Spheron type)

| Reaction | Content of aminoacids$^a$, $\mu$mol g$^{-1}$ |
|---|---|
| Z-Gly-D-Leu—OH + NH$_2$—Sph | Gly 88, Leu 70 |
| Z-Gly-D-Phe—OH + NH$_2$—Sph | Gly 115, Phe 100 |
| Ac-DL-Lys(Z)-OH + NH$_2$-Sph | Lys 36 |
| Ac-L-Lys-(Z)—OH + NH$_2$—Sph | Lys 45 |
| Boc-L-Lys(Z)-L-Ala-Gly—OH + NH$_2$—Sph | Gly 75, Ala 79, Lys 73 Gly 66$^b$, Ala 64$^b$, Lys 58$^b$ |
| Boc-L-Lys(Z)-L-Ala-Gly-Tcp$^c$+ NH$_2$—Sph | Gly 63, Ala 66, Lys 61 |
| Boc-L-Leu—OH + NH$_2$—Sph | Leu 47 |
| Z-D-Leu$^d$ + NH$_2$—Sph | Leu 13 |
| Nps-D-Leu—OH + NH$_2$—Sph | Leu 3 |
| Z-Gly-D-Phe-L-Leu—OH + NH$_2$—Sph | Gly 33, Leu 33, Phe 29 |
| Z-Gly-L-Phe-L-Leu-Gly-L-Phe-D-Leu—OH + NH$_2$—Sph | Gly 24, Leu 25, Phe 24 |
| H-D-Phe—OCH(C$_6$H$_5$)$_2$ + HOOC—Sph | Phe 40 |
| H-L-Ala—OCH(C$_6$H$_5$)$_2$ + HOOC—Sph | Ala 18 |
| H-L-Ala—OCH(C$_6$H$_5$)$_2$$^e$ + HOOC—Sph | Ala 2 |

$^a$Determined by the aminoacid analysis;
$^b$after cleavage of protective groups;
$^c$trichlorophenyl ester;
$^d$in an aqueous solution by means of 1-ethyl-3(3'-dimethylaminopropyl)carbodiimide methoiodide;
$^e$in dimethylformamide.
Gly means glycine; Leu means leucine; Phe means phenylalanine; Ala means alanine; Lys means lysine. The number at the aminoacids (e.g. Gly 88, Leu 70) indicates an amount of covalently bonded aminoacids in the corresponding derivative ($\mu$mol/g).

EXAMPLE 1

Z-Gly-D-Leu-Spheron

A copolymer of 2-hydroxyethyl methacrylate with ethylene dimethacrylate (1 g, Spheron 300) was chemically modified in the reaction with 1,6-hexamethylenediamine using activation with cyanogen bromide according to British Pat. No. 1,429,534. Triethylamine (0.5 ml) was added to the suspension of this gel in 5 ml of tetrahydrofuran and the mixture was allowed to stand under occasional stirring at the ambient temperature for 10 minutes. The gel was then filtered off and washed three times with 5 ml portions of tetrahydrofuran on a fritted-glass filter. The material was transfered into a flask and 5 ml of tetrahydrofuran, 89 mg of benzyloxycarbonyl-glycyl-D-leucine and 125 mg of 1-ethoxycarbonyl-2-ethoxy-1,2-dihydroquinoline were added. The mixture was shaken in a shaker for 5 hr, then further 50 mg of the quinoline reagent was added and shaking was continued for another 10 hours. The suspension was then washed with 50 ml of tetrahydrofuran, the gel was filtered and dried. The product was analyzed on the content of aminoacids (Table) and further used in the affinity chromatography (see Table).

Isolation of the high-active chymotrypsin by the affinity chromatography on Z-Gly-D-Leu-NH-Spheron Chymotrypsin (100 mg, esterase activity on ATEE 135 $\mu$mole/min. mg) was dissolved in 10 ml of 0.05 M TRIS-HCl buffer solution of pH 8.0 and soaked in a column of Z-Gly-D-Leu-NH-Spheron gel (containing 100 $\mu$mole Phe/g of gel) of a volume about 40 ml. To allow orientation of bonding sites of enzymatic and inhibitor molecules, the elution with 0.05 M TRIS-HCl buffer solution was started first 10 minutes after soaking. First fraction contained the material without chymotrypsin activity. Active chymotrypsin was eluted from the gel with 0.1 M acetic acid adjusted by addition of ammoniak to pH 3.1. After desalting on Sephadex G25 in 0.025 M ammonium acetate, 54 mg of chymotrypsin was obtained having the esterase activity 248 μmole/min.mg. The esterase activity was determined on ATEE according to Axen and Ernback (Eur. J. Biochem. 1971, 18, 351).

EXAMPLE 2

L-Lys-L-Ala-Gly-NH-Spheron (reaction with trichlorophenyl ester)

A copolymer of 2-hydroxyethyl methacrylate with ethylene dimethacrylate (1 g, Spheron 300) chemically modified with 1,6-hexamethylenediamine was treated with triethylamine analogously to Example 1. The resulting material was transfered into a flask and 180 mg ($0.25 \times 10^{-3}$ mole) of tert-butyloxycarbonyl-(N-benzoloxycarbonyl)-L-Lysyl-L-alanyl-glycine trichlorophenyl ester, 40 μl of triethylamine and 10 ml of tetrahydrofuran was added, The mixture was shaken for 16 hr, the gel was filtered off, washed three times with 10 ml portions of tetrahydrofuran, 50 ml of ether and dried. A sample (70 mg) was analyzed on the content of aminoacids (see Table). The residual polymer was reacted with 15 ml of 33% HBr in glacial acetic acid to cleave the protective groups from peptide molecules. After 15 minutes of treatment, the mixture was diluted with 30 ml of acetic acid, the gel was filtered off and washed on the filter three times with 5 ml portions of acetic acid, with water as long as the acidic reaction ceased, with ethanol and ether and dried. The resulting material was analyzed on the content of aminoacids and used for the affinity chromatography similarly as in Example 1.

EXAMPLE 3

D-Phenylalanine acylated with carboxy-Spheron (D-Phe-COO-Spheron)

HOOC-Spheron (0.90 g) prepared by the reaction of a copolymer of 2-hydroxyethyl methacrylate with ethylene dimethacrylate (Spheron 700) with ε-aminocaproic acid was mixed with 5 ml of tetrahydrofuran, 2.23 g of D-phenylalanine benzhydryl ester and 0.172 g of 1-ethoxycarbonyl-2-ethoxy-1,2-dihydroquinoline. The mixture was shaken for 6 hours, then another 50 mg of the quinoline derivative was added and shaking was continued for further 4 hr. The solid was filtered off, washed on filter with tetrahydrofuran, water, ethanol and ether and dried. A sample (50 mg) was analyzed on the content of aminoacids.

To cleave off the protective group, the polymeric material was dispersed in 3 ml of trifluoroacetic acid, the mixture was allowed to stand for 30 min, then diluted with water, the solid was filtered off, washed on filter with water to the neutral reaction, then with ethanol an ether and dried. The resulting material was analyzed on the content of free carboxylic groups and used in the affinity chromatography.

Carboxypeptidase A (an enzyme I.U.B. No. 3.4.2.1) (10 mg) was dissolved in 2 ml of 0.05 M TRIS-HCl buffer solution of pH 8.0 which contained 0.3 N NaCl. The solution was put on a column of D-Phe-COO-Spheron (containing 40 μmole Phe/g of gel) of a volume 8 ml (10×100 mm). After 10 minutes delay, the column was eluted with the buffer solution. All enzyme was selectively retained and released first by changing pH of the buffer with 0.1 M acetic acid.

EXAMPLE 4

Stepwise building of tripeptide Z-Gly-D-Phe-L-Leu on NH$_2$-Spheron

A suspension of 3 g of a copolymer of 2-hydroxyethyl methacrylate with ethylene dimethacrylate (Spheron 500) which was modified by the reaction with 1,6-hexamethylenediamine was treated with 1.5 ml of triethylamine for 10 min with occasional stirring. The gel was then filtered off, three times washed with 10 ml portions of tetrahydrofuran and transfered to a flask containing 15 ml of tetrahydrofuran, 0.21 g (0.90 m mole) of tert-butyloxycarbonyl-L-leucine and 0.23 g of 1-ethoxycarbonyl-2-ethoxy-1,2-dihydroquinoline. The mixture was shaken for 8 hours, another 50 mg of the quinoline derivative was then added and shaking was continued for further 5 hours. The solid material was filtered off, washed with tetrahydrofuran and ether and dried. A sample (70 mg) was analyzed on the content of aminoacids.

Trifluoroacetic acid (5 ml) was poured into 2.5 g of the reaction product from the above preparation, the suspension was allowed to stand for 15 minutes, then it was diluted with water, the solid was filtered off, washed with water to the neutral reaction, further washed with ethanol and ether, dried and dispersed in 15 ml of tetrahydrofuran. The suspension was mixed with 0.335 g of tert-butyloxycarbonyl-D-phenylalanine dicyclohexylammonium salt and 0.192 g of 1-ethoxycarbonyl-2-ethoxy-1,2-dihydroquinoline. The mixture was shaken for 6 hours, further 50 mg of the quinoline reagent was added and shaking was continued for another 6 hours. The solid material was then filtered, washed successively with tetrahydrofuran, water, ethanol and ether and dried. The sample was analyzed on the content of aminoacids.

The resulting material (2 g) was dispersed in 4 ml of trifluoroacetic acid. The suspension was allowed to stand for 15 min, then diluted with water, the solid was filtered off, washed with water to the neutral reaction, further washed with ethanol and ether, dried and dispersed in 10 ml of tetrahydrofuran. The suspension was mixed with 0.115 ml of dicyclohexylamine, 0.113 g of benzyloxycarbonyl-glycine and 0.138 g of 1-ethoxycarbonyl-2-ethoxy-1,2-dihydroquinoline, shaken for 6 hours, then another 50 mg of the quinoline reagent was added and shaking was continued for further 6 hours. The solid material was filtered off, washed with tetrahydrofuran, water, 1 M HCl, water, ethanol and ether and dried. The obtained product was analyzed on the content of aminoacids and used in the affinity chromatography.

EXAMPLE 5

D-Leu-NH-Spheron

N-Benzyloxycarbonyl-D-leucine (100 mg) was dissolved in 10 ml of dimethylformamide, 10 ml of a swollen copolymer of 2-hydroxyethyl methacrylate with ethylene dimethacrylate (Spheron 300) modified by the reaction with hexamethylenediamine was added and the suspension was adjusted with 1 M solution of HCl to pH 4.7. Then, 1 ml of a 15% solution of 1-ethyl-3(3-dimethylaminopropyl)carbodiimide methoiodide was dropwise added to the suspension within 5 minutes. The reaction mixture was stirred for 20 hours at the laboratory temperature. On completion of the reaction, the gel was washed with 50% solution of dimethylformamide and water. D-Leucine was determined in a hydroxysate obtained by the acid hydrolysis of the resulting gel. It was found that 3.6 μmole of Z-D-leucine was bonded to 1 ml of swollen $NH_2$-Spheron 300 (corresponds to 13 μmole/g of gel). The protective benzyloxycarbonyl group was then cleaved from this derivative of Z-D-leucine by the reaction of 2.5 g of the dry gel with 15 ml of a hydrogen bromide solution in acetic acid (the laboratory temperature, 30 min). The gel was then washed with water, ethanol and ether and used in the affinity chromatography of aminopeptidase from a crude proteolytic preparation of the mould Aspergillus flavus.

The dialyzed crude proteolytic preparation from the mould Aspergillus flavus (300 mg, the alcoholic precipitate of the cultivation liquid) was dissolved in 100 ml of the buffer solution A (0.05 M TRIS-HCl+0.01 M $CaCl_2$; pH 8.0). Into the solution, 70 ml of D-Leu-NH-Spheron, which was separated by suction, was added (13 μmole Leu/g of gel) and the mixture was moderately shaken for 15 minutes. The solution with the gel was then transfered into a column of a diameter 3 cm and washed with the buffer solution A. Fractions of 18 ml were collected in intervals of 15 minutes. The material which contained all proteases with the haemoglobin activity together with inactive components was eluted into initial six fractions. Further 14 tractions collected in the continued elution exhibited no proteolytic activity and did not contain proteins according to the absorbance measurement at 280 nm. However, the column retained compounds which exhibited the entire aminopeptidase activity determined by the cleavage of L-leucine-p-nitranilide. The entire aminopeptidase activity was desorbed and eluted in a sharp peak with a buffer solution B (the buffer solution A+2 N NaCl solution). The eluted material did not exhibit any proteolytic activity on haemoglobin.

The aminopeptidase activity was determined by the modified method of Pfleiderer (G. Pfleiderer: Methods in Enzymology, 1970, 19, 514). A substrate for determination of the activity was 1.66 mM L-Leucine-p-nitranilide in 0.05 M TRIS-HCl buffer solution of pH 8.0. The amount of nitranilide released after 10 minutes of incubation at 37° C. was measured by absorbance at 405 nm. Solutions of denaturated haemoglobin served as the substrate for measurement of the proteolytic activity at pH 6 and pH 8. The concentration of proteins in solutions was determined by Folin's reagent according to the method developed by Lowry (H. O. Lowry et al. J. Biol. Chem. 1951, 193, 265). Unit of the enzymatic activity of aminopeptidase was defined as the amount of enzyme which releases 1 μmole of p-nitranilide during 1 minute under described experimental conditions. The specific activity was calculated by relating these units to mg of the protein.

The specific activity of the starting material was 0.336 units/mg of protein (3 mg of the dialyzed proteolytic preparation contained 0.5 mg of the protein). From the processed amount, 7.7 mg of aminopeptidase was obtained which had the specific activity 2.17 units/mg of protein.

EXAMPLE 6

Z-Gly-D-Phe-NH-Spheron

A copolymer of 2-hydroxyethyl acrylate with ethylene diacrylate (100 g, Spheron A) was chemically modified by the reaction with 1,6-hexamethylenediamine and 10 g of benzyloxycarbonyl-glycyl-D-phenylalanine analogously to Example 1. The low-activity chymotrypsin (100 mg, the esterase activity measured on N-acetyl-L-tyrosine ethyl ester at pH 7.9 was 135 μmole/min.mg) was dissolved in 200 ml of 0.05 M TRIS-HCl buffer solution of pH 8.0 and 40 ml of Z-Gly-D-Phe-NH-Spheron A separated by suction was added (contained 70 μmole Leu/g of gel) and the mixture was moderately shaken for 15 minutes. The material was transfered into a column (the same parameters as in Example 1) and eluted with the 0.05 M TRIS-HCl buffer solution giving the analogous result as in Example 1.

EXAMPLE 7

A copolymer of 2-hydroxypropylmethacrylamide with ethylene dimethacrylate having the molecular weight exclusion limit 300,000 (1 g), which was prepared according to U.S. Application Ser. No. 568,777 filed Apr. 17, 1975, now U.S. Pat. No. 4,062,831 issued Dec. 13, 1977 was activated by the reaction with BrCN and allowed to react with 1,6-hexamethylenediamine according to U.S. application Ser. No. 579,715 filed May 21, 1975. The resulting product was condensed with 90 mg of benzyloxycarbonyl-glycyl-D-leucine in 5 ml of tetrahydrofuran similarly as in Example 1. The sorbent was washed and dried and used for the affinity chromatography of chymotrypsin.

EXAMPLE 8

A copolymer of 2-(hydroxyethyl)hexyl methacrylate with trimethylolpropane trimethacrylate (1 g) prepared according to U.S. Application Ser. No. 235,427 filed Mar. 16, 1972, now abandoned and having the molecular weight exclusion limit 100,000 was activated by the reaction with cyanogen bromide and allowed to react with ethylenediamine according to U.S. Application Ser. No. 579,715 filed May 21, 1975. The resulting product was condensed with 80 mg of Z-Gly-D-Phe-L-leucine in 50 ml of tetrahydrofuran in the same way as in Example 1. The sorbent was washed and dried and used in the affinity chromatography of trypsin.

EXAMPLE 9

A copolymer of tetraethylene glycol monomethacrylate with 2,2'-dimethylpropanediol dimethacrylate having the molecular weight exclusion limit 500,000 (1 g) was activated by the reaction with cyanogen bromide and allowed to react with 1,10-decanediamine. The resulting product was condensed with D-phenylalanine in 5 ml of tetrahydrofuran, washed, dried and used in the affinity chromatography of chymotrypsin.

We claim:

1. Specific sorbent, wherein D-aminoacid or a peptide containing D-aminoacid units in amount of 8-100 μmol/g is covalently bonded to a solid particulate hydrophilic polymeric carrier of a copolymer of hydroxyalkyl ester or hydroxyalkylamide of acrylic or methacrylic acid with crosslinking ethylene diacrylate or ethylene dimethacrylate comonomers.

2. Specific sorbent as set forth in claim 1, wherein the particulate copolymer has a spherical shape.

* * * * *